US010987610B1

(12) United States Patent
Mayer (10) Patent No.: US 10,987,610 B1
(45) Date of Patent: Apr. 27, 2021

(54) ATMOSPHERIC WATER GENERATION HAVING MULTI-STAGE PATHOGENS NEUTRALIZING ELEMENTS

(71) Applicant: Richard Arthur Mayer, Reno, NV (US)

(72) Inventor: Richard Arthur Mayer, Reno, NV (US)

(*) Notice: Subject to any disclaimer, the term of this patent is extended or adjusted under 35 U.S.C. 154(b) by 603 days.

(21) Appl. No.: 15/586,231

(22) Filed: May 3, 2017

Related U.S. Application Data

(60) Provisional application No. 62/331,339, filed on May 3, 2016.

(51) Int. Cl.
*F24F 3/14* (2006.01)
*B01D 5/00* (2006.01)
*E03B 3/28* (2006.01)

(52) U.S. Cl.
CPC ......... *B01D 5/0072* (2013.01); *B01D 5/0003* (2013.01); *B01D 5/009* (2013.01); *E03B 3/28* (2013.01); *F24F 3/14* (2013.01); *B01D 2259/4525* (2013.01); *B01D 2259/804* (2013.01)

(58) Field of Classification Search
CPC ........ F24F 3/02; F24F 3/04; F24F 3/06; F24F 3/065; F24F 3/08; F24F 3/10; F24F 3/16; B01D 5/0072
See application file for complete search history.

(56) References Cited

U.S. PATENT DOCUMENTS

| 8,800,814 | B2* | 8/2014 | Braun | B67D 3/0009 |
| | | | | 222/105 |
| 2004/0120845 | A1* | 6/2004 | Potember | A61L 9/015 |
| | | | | 422/4 |
| 2006/0086252 | A1* | 4/2006 | Huang | A61L 9/20 |
| | | | | 96/134 |
| 2006/0112711 | A1* | 6/2006 | Yoon | B01D 5/0006 |
| | | | | 62/285 |
| 2008/0022694 | A1* | 1/2008 | Anderson | B01D 5/0072 |
| | | | | 62/3.4 |
| 2008/0314062 | A1* | 12/2008 | Ritchey | B01D 53/265 |
| | | | | 62/291 |
| 2012/0085927 | A1* | 4/2012 | Maeng | A61L 9/20 |
| | | | | 250/454.11 |
| 2013/0255280 | A1* | 10/2013 | Murphy | E03B 3/28 |
| | | | | 62/3.4 |

* cited by examiner

*Primary Examiner* — David J Teitelbaum
(74) *Attorney, Agent, or Firm* — Kerr IP Group, LLC (57) ABSTRACT

Systems for atmospheric water generation are disclosed. An illustrative system may comprise a first housing, an air intake filter disposed within the housing and coated with titanium dioxide to neutralize airborne pathogens, a water collector disposed below the cooling element, and a water storage tank coupled to the water collector. The system filters the water with a pathogen neutralizing module configured to receive approximately 12 pounds per square inch (psi) of pressure, wherein 12 psi pressure is configured to removed pathogens from the collected water in closed loop and pressured second subsystem.

10 Claims, 11 Drawing Sheets

ATMOSPHERIC WATER GENERATION HAVING MULTI-STAGE PATHOGENS NEUTRALIZING ELEMENTS

CROSS-REFERENCE TO RELATED APPLICATIONS

This application claims the benefit under 35 U.S.C. 119(e) of U.S. Provisional Application No. 62/331,339, filed May 3, 2016, and entitled SYSTEMS FOR ATMOSPHERIC WATER GENERATION, which is incorporated herein by reference in its entirety.

FIELD

The present disclosure relates to systems and methods for atmospheric water generation, which systems and methods for dehumidifying atmospheric moisture include filtering and sterilizing the condensed atmospheric moisture.

BACKGROUND

Atmospheric water generation systems typically comprise a cooling element, such as a coil, that is cooled below the dew point to condense water from the atmosphere. Condensed water is collected in a tank, passed through one or more filtration systems, and dispensed as drinking water.

However, many such systems typically expose collected water to various atmospheric pathogens during the collection and filtration processes. Further, these systems are known to harbor and grow bacterial pathogens. As a result, although water may be collected from the atmosphere and filtered, there may still be some uncertainty as to the safety of the water for drinking.

In addition, many existing systems comprise an integral collection and filtration unit, and the unit, which may be disposed outdoors, may not therefore include a tap or water dispenser at an indoor location. Or, where integral water generation systems are disposed indoors, they may generate unwanted compressor/pump noise. These systems may not, in addition, include remote access capabilities, requiring users to be physically present at the system location to operate the system.

It would be beneficial to provide an atmospheric moisture generator that did not require users to be present at the atmospheric moisture generator, which is commonly an outdoor location, in order to drink water from the tap or control the operating functions of the atmospheric moisture generator. Additionally, it would be beneficial to provide an atmospheric water generator that did not expose collected water to atmospheric pathogens during the collection and filtration processes.

SUMMARY

Disclosed herein is a system for atmospheric water generation that includes a first subsystem and a second subsystem. The first subsystem may include a first housing, an air intake filter disposed within the housing and coated with titanium dioxide to neutralize airborne pathogens, a cooling element disposed within the first housing that abuts the air intake filter and is coated with titanium dioxide to neutralize pathogens in liquid water, a water collector disposed below the cooling element, and a water storage tank coupled to the water collector. The second subsystem may be coupled to the first subsystem and include a second housing, a pathogen neutralizing module disposed in the second housing, a water storage bladder coupled to the pathogen neutralizing module, and a tap coupled to the water storage bladder.

In one illustrative embodiment, the water is filtered with a pathogen neutralizing module configured to receive approximately 12 pounds per square inch (psi) of pressure, wherein 12 psi pressure is configured to removed pathogens from the collected water.

In various embodiments, the air intake filter includes a plurality of ultraviolet LEDs for neutralizing airborne pathogens, which LEDs may operate at a wavelength of 254 nanometers. In some embodiments, the cooling element is configured to be irradiated by a second plurality of ultra violet LEDs for neutralizing pathogens in liquid water, which LEDs may operate at a wavelength of 254 nanometers.

In further embodiments, the first subsystem may be located in an outdoor location and the second subsystem may be located in an indoor location. In still further embodiments, the first subsystem is separated from the second subsystem and connected to the second subsystem by an external water tube that couples the first subsystem to the second subsystem. In even further embodiments, water may be stored within the water storage tank at a pressure in the range of 12 PSI to 14 PSI.

Another illustrative system may include a first subsystem that is configured to condense and collect water from the atmosphere. The first subsystem may include a first housing, an air intake filter disposed in the first housing that is coated with titanium dioxide to neutralize airborne pathogens, and a cooling element abutting the air intake filter that is also coated with titanium dioxide to neutralize airborne pathogens.

The system may further include a second subsystem that is configured to receive the collected water. The second subsystem may include a second housing, a water storage bladder disposed within the second housing, an inlet in the second housing that is coupled to a water tube, and a tap in the second housing that is coupled to the water storage bladder.

In various embodiments, the air intake filter includes a plurality of ultraviolet LEDs for neutralizing airborne pathogens, which LEDs may operate at a wavelength of 254 nanometers. In some embodiments, the cooling element is configured to be irradiated by a second plurality of ultra violet LEDs for neutralizing pathogens in liquid water, which LEDs may operate at a wavelength of 254 nanometers.

In further embodiments, the first subsystem may be located in an outdoor location and the second subsystem may be located in an indoor location. In still further embodiments, the first subsystem is separated from the second subsystem and connected to the second subsystem by an external water tube that couples the first subsystem to the second subsystem. In even further embodiments, water may be stored within the water storage tank at a pressure in the range of 12 PSI to 14 PSI.

A method for generating atmospheric water may include receiving intake air at an air intake filter as the intake air passes over a titanium dioxide coating on the air intake filter that neutralizes airborne pathogens; cooling the intake air by a cooling element coated with titanium dioxide to neutralize pathogens in liquid water condensing from the intake air on the cooling element, wherein the cooling element abuts the air intake filter; and collecting the condensed water in a water collector disposed below the cooling element.

Various methods may further include, irradiating the intake air as it passes over the air intake filter by a first plurality of ultraviolet LEDs. Still other methods may include irradiating the liquid water as it condenses on the cooling element by a second plurality of ultraviolet LEDs.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the claimed subject matter may be practiced. It is to be understood that other embodiments may be utilized and structural changes may be made without departing from the scope of the claims. It is further understood that the steps described with respect to the disclosed processes may be performed in any order and are not limited to the order presented herein.

As stated above, existing atmospheric water generators are frequently standalone units that operate more effectively when located outdoors. However, this requires users to be present at the atmospheric water generator, and outdoors to retrieve water from the atmospheric water generator. Alternatively, existing standalone atmospheric water generators may be located indoors to facilitate more convenient access to the collected water. However, an indoor location reduces the efficiency of atmospheric water generators because indoor air commonly has a lower dew point temperature and a lower humidity.

Additionally, atmospheric water generators commonly employ a pump to operate the cooling element, which pump creates noise that is not desirable for an indoor atmospheric water generator. Therefore, there is a need for an atmospheric water generator that does not pollute an indoor location, such as a home, with the noise of the cooling element that condenses water and takes advantage of the benefit of condensing warmer, wetter outdoor air, yet still allows a user the convenience of dispensing water at an indoor location.

The systems and methods disclosed herein overcome the deficiencies of existing atmospheric water generators by employing two subsystems that are separate from one another. This separation provides the benefit of allowing the collection portion of the system to be located at a remote location, such as outdoors, while dispensing water from the second portion of the system at a tap in a desired location, such as indoors. In this manner, the noise of the collection system does not disturb the user at the remote location, and the collection system is exposed to warmer and more humid outdoor air that can be more efficiently condensed by an atmospheric water generator.

Existing atmospheric water generators struggle with pathogen exposure and growth in the system. The outdoor air frequently used by atmospheric water generators contains a variety of pathogens. Existing atmospheric water generators attempt to eliminate these pathogens with a combination of one or more filters, LED generated ultraviolet radiation, and exposure to ozone. However, these systems fail to completely remove pathogens from the collected water. This is especially problematic at the interior surfaces and components of atmospheric water generators, which are constantly exposed to moist climates, standing water, and/or moderate temperatures due to their location within the atmospheric water generator. Filters fail to prevent at least some pathogens from passing through, LEDs may not provide sufficiently intense ultraviolet radiation to neutralize pathogens only in certain areas of an atmospheric water generator, and ozone generators include potential fire hazards, toxicity issues, and higher operational costs, as well as requiring additional pre-treatment and post-treatment filtration.

The systems and methods disclosed herein overcome the deficiencies of existing atmospheric water generators by including a titanium dioxide coating on various internal surfaces and components of an atmospheric water generator. In some conditions, titanium dioxide coatings neutralize pathogens on contact. Such an additional neutralization element may further sterilize collected water continually, without requiring the collected water to be pumped through a filter, exposed to ultraviolet radiation, or treated with ozone. In operation, collected water often sits idle within an atmospheric water generator for long periods of time between initial sterilization upon collection and storage, and later dispensation by a user. The relatively long periods of inactivity allow pathogens to proliferate on internal surfaces of an atmospheric water generator or within collected water. Thus, the passive sterilization offered from titanium dioxide coatings is beneficial because it is constantly neutralizing pathogens, even when the atmospheric water generator is not dispensing or collecting water.

Existing atmospheric water generators are frequently stand alone units that operate more effectively when located outdoors. However, this requires users to be present at the atmospheric water generator, and often outdoors, to control the operation of the atmospheric water generator. Additionally, optimal water collection times may be at night, early morning, or on days having particularly beneficial water condensing conditions, such as a high dew point temperature. Therefore, it may be inconvenient and undesirable for a user to operate an atmospheric water generator efficiently that requires the user to come to the location of the atmospheric water generator to control the water collection processes of the atmospheric water generator.

The systems and methods disclosed herein provide remote access and control capabilities using a downloaded smartphone application, which is also referred to as na "app.". Thus, users may monitor and change the operating mode of one or more remotely located atmospheric water generators without the inconvenience of having to be present at the one or more atmospheric water generators.

Figure 1:
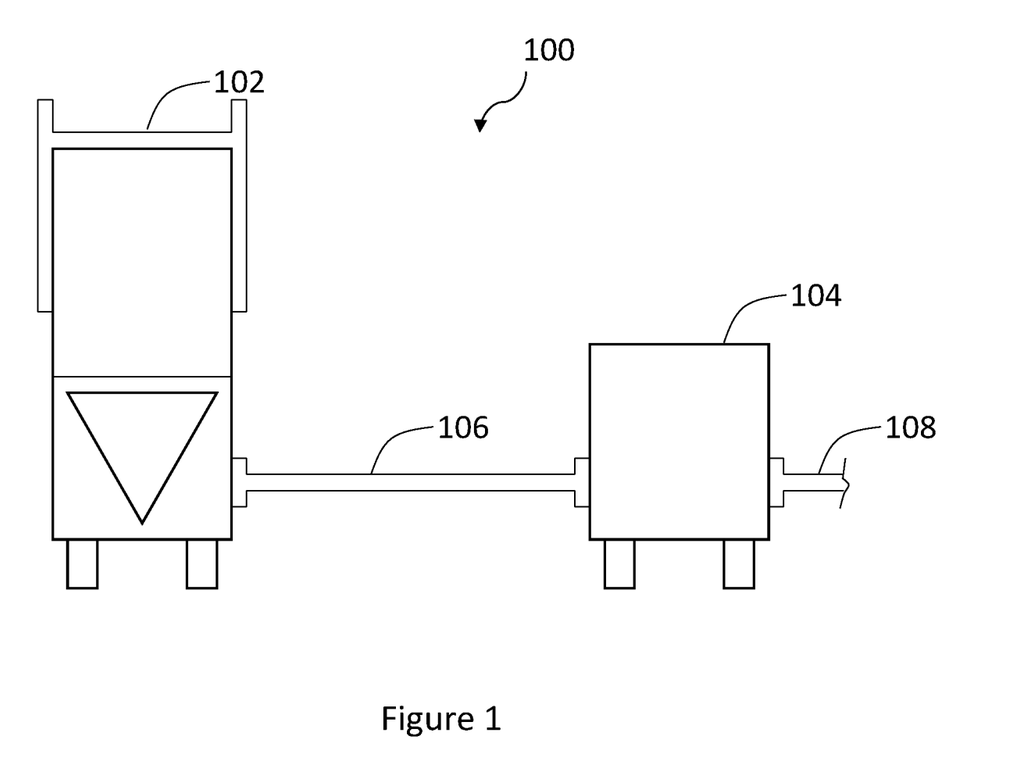
FIG. 1 shows an illustrative system for atmospheric water generation as described herein and in accordance with various embodiments.
Figure 2:
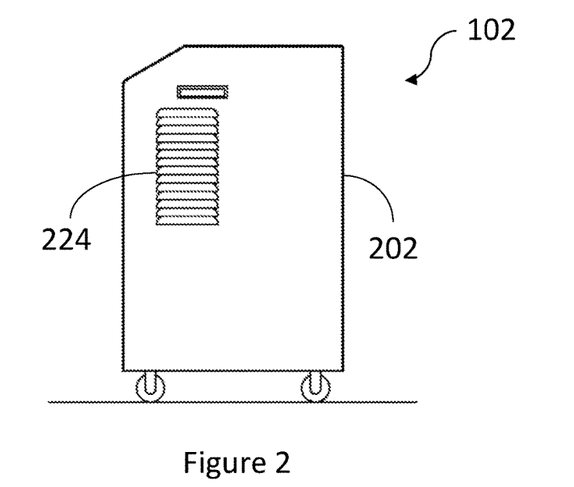
FIG. 2 shows an illustrative first side view of a first subsystem of the system for atmospheric water generation as described herein and in accordance with various embodiments.
Figure 3:
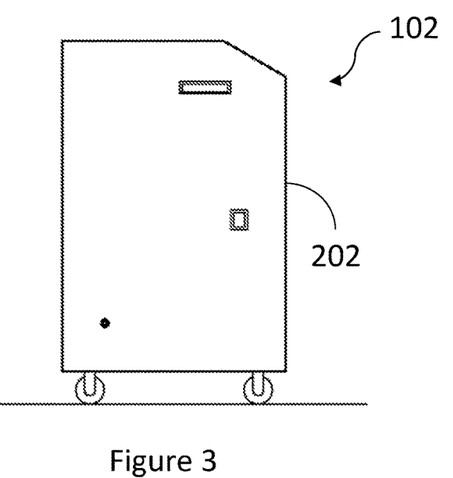
FIG. 3 shows an illustrative front view of the first subsystem of the system for atmospheric water generation as described herein and in accordance with various embodiments.
Figure 4:
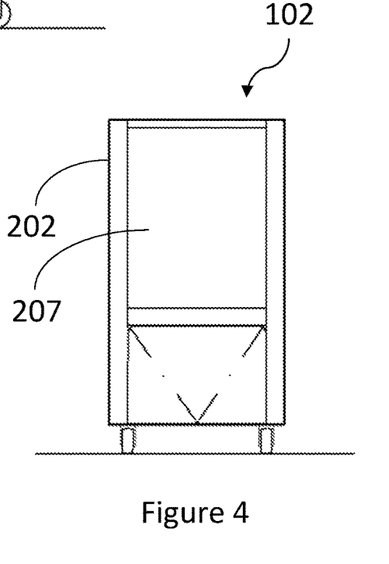
FIG. 4 shows an illustrative second side view of the first subsystem of the system for atmospheric water generation as described herein and in accordance with various embodiments.

With reference to FIG. 1, there is shown an illustrative system 100 for atmospheric water generation. The term "atmospheric water generation" can be used interchangeably with "atmospheric water generator," and the terms are used interchangeably herein. As described herein, the system 100 may collect and purify atmospheric moisture to produce drinking water.

The illustrative system 100 includes a first subsystem 102 and a second subsystem 104. The first subsystem 102 may be coupled, such as by way of a pipe, tubing, water tube, conduit or other such water transmission materials 106 to the second subsystem 104. The first subsystem 102 may collect and transfer atmospheric moisture to the second subsystem 104 for dispensation as drinking water through a water outlet or tap 108. The water tube 106 coupling the first subsystem 102 to the second subsystem 104 allows the first subsystem 102 to be separate from the second subsystem 104 and remotely located. By way of example and not of limitation, the first subsystem 102 may be located outdoors and the second subsystem 104 may be located indoors. As a further non-limiting example, the first subsystem 102 may be in a basement or closet and the second subsystem 104 may be in a kitchen.

In operation, water vapor in the air, i.e. humidity, enters the illustrative first subsystem 102 and the water vapor is condensed and collected from the humid air. The collected water is then held in the first subsystem 102 and transferred through the water tube 106 to the second subsystem 104, which is indoors. The collected water is then stored in the second subsystem 104 for later dispensation at the water outlet or tap 108.

With reference to FIGS. 2-6, there are shown various views of an illustrative first outdoor subsystem 102. The illustrative first outdoor subsystem 102 may comprise a first housing 202, a cooling element 204, an air intake filter 206, a plurality of light emitting diodes (LEDs) 208, a water collector 210, and a water storage tank 212. Although the illustrative system includes a vent that receives humid air, the collected water system operates in a pressurized closed loop system that maintains an positive pressure between the first subsystem 102 and the second subsystem 104. The closed loop system includes a pump (not shown) that maintains the positive pressure throughout the system and serves to overcome line losses due to friction and passive drops over valves, fitting and equipment.

Humid air enters the first subsystem 102 through the air intake filter 206, where an initial portion of pathogens is removed from the humid air. The humid air then contacts the cooling element 204, which condenses water vapor from the air on to the cooling element 204 as the cooling element 204 suddenly lowers the temperature of the air. The condensed water then runs into the water collector 210 due to gravity and is fed into a water storage tank 212. In the illustrative embodiment, the first subsystem 102 is outdoors where the air is more humid than indoors. In humid environments, indoor cooling from air conditioning systems reduces the amount of humidity in the air. Thus, it is harder to collect water vapor inside a cool room or structure than outside in a more humid environment.

In various embodiments, the first housing may comprise an intake vent 224. The intake vent 224 may include a plurality of vent holes or vent apertures that allow air to flow through the intake vent 224 and into the air intake filter 206.

The housing 202 may house the cooling element 204, the air intake filter 206, the plurality of LEDs 208, the water collector 210, and the water storage tank 212. The housing 202 may be sealed during operation such that humid air is only able to enter the housing 202 through the air intake filter 206. Thus, during operation, the air flow through the air intake filter 206 may be maximized, because humid air is not permitted to enter the sealed housing 202 through unsealed crevices in the housing 202. In various embodiments, the housing 202 may be sealed and pressurized.

The cooling element 204 may comprise any cooling element suitable to condense water vapor out of the atmosphere. For example, the cooling element 204 may comprise a typical refrigerated cooling element or coil capable of cooling air passing over its surface to condense water vapor. The typical refrigerated cooling element is operated by circulating Freon or other such common refrigerant working fluids within a closed system at various temperatures and pressures. In particular, a pump or compressor pressurizes the refrigerant in one stage, and allows the refrigerant to expand in a second stage where the refrigerant absorbs energy from matter, such as humid air. In various embodiments, the working fluid circulating in the cooling element 204 may be water from a natural or existing energy sink, such as a well, lake, or river, to provide an energy efficient cooling element 204. The cooling element 204 may be carbon coated to neutralize airborne or surface pathogens, such as bacteria and other microbial organisms. Similarly, in various embodiments, the cooling element 204 may be coated with titanium dioxide, such as by a titanium dioxide paint, to neutralize airborne or surface pathogens. For example, carbon or titanium dioxide may be baked, painted, sprayed, sputtered, infused, or otherwise deposited on the cooling element 204 to form a coating. In various embodiments, it may be advantageous to bake the titanium dioxide layer onto the cooling element 204 and other system components as described herein, because sprayed or painted titanium dioxide may decompose, chip, flake, or otherwise degrade in the presence of liquid water.

In one embodiment, the air intake filter 206 may fit into a removable intake vent panel 207 or a portion of an intake vent panel of the housing 202. The intake vent panel 207 may include a plurality of vent holes or vent apertures that allow air to flow through the intake vent 207 and into the air intake filter 206. In another embodiment, the intake vent panel 207 is removable and has no vent holes or apertures. The interior portion of the air intake filter 206 may abut or face the cooling element 204. The intake filter 206 may comprise any suitable air filter and may be configured, treated, or adapted to neutralize airborne or surface pathogens.

Figure 5:
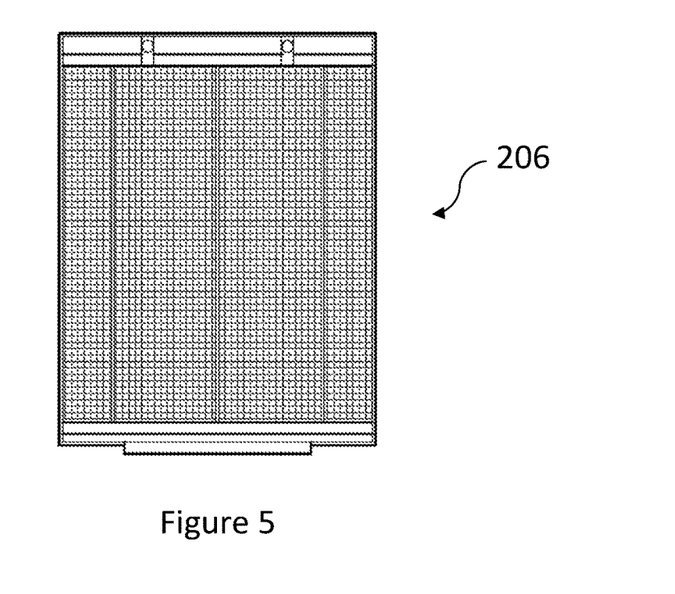
FIG. 5 shows an illustrative interior portion of an air intake filter of the first subsystem as described herein and in accordance with various embodiments.

For example, and with particular reference to FIG. 5, there is shown an interior (to the housing) portion of the air intake filter 206. The interior portion of the filter 206 may include the plurality of LEDs 208, which may be mounted to the air intake filter 206 by one or more fasteners, one or more clamps, by an adhesive, by a heat bonding technique, by bolts or screws, by an integral manufacturing or formation technique, and the like.

In various embodiments, the air intake filter 206 may include carbon or titanium dioxide to neutralize airborne or surface pathogens. For example, carbon or titanium dioxide may be baked, painted, sprayed, sputtered, infused, or otherwise deposited on either or both of the exterior and interior portions of the intake filter 206. In this manner, the air filter 206 may be coated with carbon or titanium dioxide.

Figure 6:
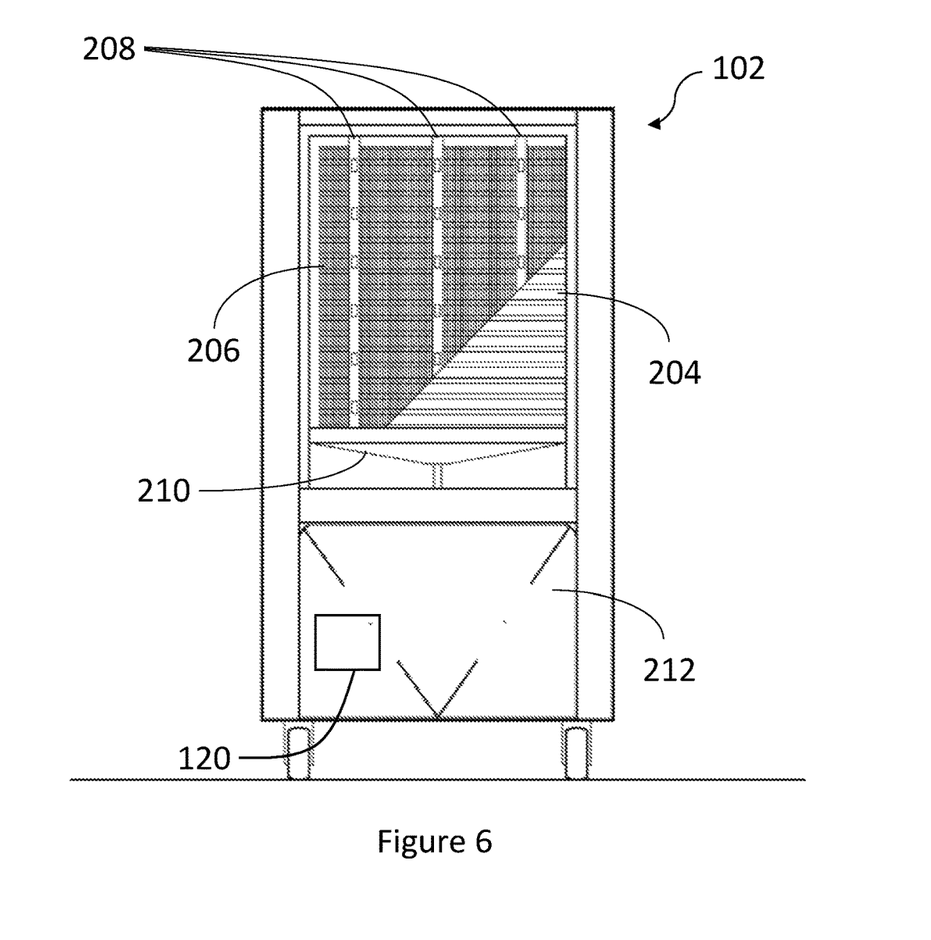
FIG. 6 shows illustrative front view of the first subsystem of the system for atmospheric water generation in which an intake vent panel is removed to expose an air intake filter as described herein and in accordance with various embodiments.

With particular reference now to FIG. 6, each of the LEDs 208 may include an ultraviolet LED capable of eliminating airborne and surface pathogens entering the system 100. In various embodiments, the system 100 may include a plurality of strips of LEDs mounted to the air intake filter 206, and the LEDs on each strip, or the strips themselves, may be variously oriented in space. For example, the air intake filter 206 may comprise three strips of LEDs, and each of the three strips of LEDs may illuminate an axis (x, y, or z) of the air intake filter 206. In an illustrative embodiment, each of the three strips may contain six LEDs each and may extend vertically, along a y-axis, of the air intake filter 206. In various embodiments, more or fewer than one LED strip per dimensional axis may be employed to eliminate airborne and surface pathogens.

The water collector 210 may be disposed under the cooling element 204 and may collect and funnel water into the water storage tank 212 as it condenses on the cooling element 204 and drips under the influence of gravity into the collector 210. The water collector 210 may be coupled by a funnel, tray, pipe, hose, or equivalent to the water storage tank 212. Again, with reference to FIG. 6, there is shown a cutaway of the air intake filter 206, with the cooling element 204. The collector 210 may, like the air intake filter 206, be coated with carbon or titanium dioxide to neutralize pathogens in the collecting water. Water may further be irradiated by one or more LEDs disposed over the surface of the collector 210 to destroy and stifle the growth of pathogens.

Figure 7:
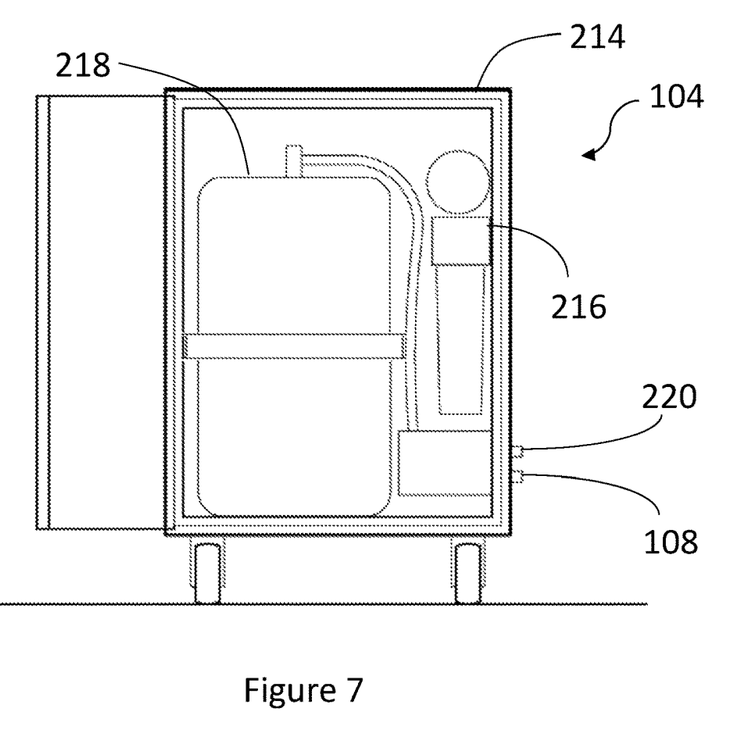
FIG. 7 shows illustrative cross-sectional view of a second subsystem of the system for atmospheric water generation as described herein and in accordance with various embodiments.
Figure 8:
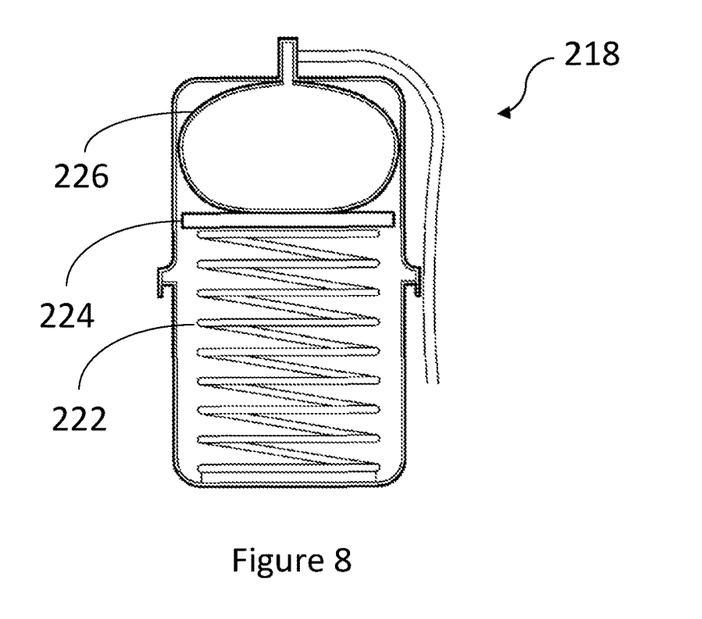
FIG. 8 shows an illustrative cross-sectional view of a water container of the second subsystem of the system for atmospheric water generation as described herein and in accordance with various embodiments.

With reference now to FIGS. 7 and 8, illustrative cross-sectional views of the second subsystem 104 are shown. Accordingly, the second subsystem 104 may comprise a second housing 214, a pathogen neutralizing module 216, a water storage container 218, a water inlet 220, and a water outlet or tap 108. The second housing 214 may house the pathogen neutralizing module 216, the water storage container 218, the water inlet 220, and the water outlet or tap 108.

The water storage container 218 may comprise a tank or vessel, and as shown with reference to FIG. 8, the water storage container 218 may contain a compressor 222, such as a mechanical spring (e.g., a helical or coil spring) or a pneumatic actuator, a platform 224, and a water storage bladder 226. The platform may be any suitable flat surface, such as steel sheet metal, aluminum sheet metal, wood, or composite. The water storage bladder 226 may comprise an antimicrobial coating or material. In various embodiments, the water storage bladder 226 may rest on the platform 224, which may, in turn, rest on the mechanical spring 222. As described below, the mechanical spring 222 may expand and contract as water is pumped into the water storage bladder 226 (contraction) or released from the water storage bladder 226 (expansion). In other words, the mechanical spring 222 may be compressed to store energy as water is pumped into the bladder 226 and, as water is released from the bladder 226 into the tap 108, the spring 222 may expand, releasing its stored energy, to squeeze the bladder 226 such that water is forced into the tap 108. The mechanical spring 222 may be further tempered along its length, such that the spring 222 is capable of exerting a constant pressure against the inflating and deflating water storage bladder 226 as the spring 222 is compressed and decompressed. The spring 222 may therefore maintain the water storage bladder 226 at a constant pressure as the water storage bladder 226 is filled and emptied of water, for example at 12 PSI. However, in other embodiments, the spring 222 maintains the water storage bladder 226 at a substantially constant pressure ranging from 10 psi to 14 psi In various embodiments, the compressor 222 is a pneumatic actuator containing a fixed mass of working fluid (i.e., air, hydraulic fluid). The pneumatic actuator exerts force constantly on the water storage bladder 226. Similar to the mechanical spring 222, the pneumatic actuator may be compressed to store energy as water is pumped into the bladder 226 and, as water is released from the bladder 226 into the tap 108, the actuator may expand, releasing its stored energy, to squeeze the bladder 226 such that water is forced into the tap 108. In another embodiment, the pneumatic actuator includes a pneumatic compressor and release valve that operate in conjunction to modulate the internal pressure of the pneumatic actuator as needed to maintain a consistent force on the water storage bladder 226.

In various embodiments, the pathogen neutralizing module 216 may comprise one or more filters, an ozone treatment module, a second plurality of LEDs, or any combination thereof.

In addition, water may pass through one or more elements comprising the pathogen neutralizing module 216 prior to entering the water storage bladder 226 and/or as the water is released from the water storage bladder 226, as described herein, on its way to the tap 108. Further, in various embodiments, water may be treated by elements of the pathogen neutralizing module 216 at both stages; that is, water may be treated prior to storage in the water storage bladder 226 and as the water exits the water storage bladder 226. By way of example and not of limitation, the pathogen neutralizing module 216 may include a filter that filters various particles from the water prior to entering the water storage bladder 226. In another illustrative embodiment, the pathogen neutralizing module 216 includes an ozone generator that releases ozone into the water storage bladder 226. In yet another illustrative embodiment, the pathogen neutralizing module 216 includes a second plurality of LEDs (not shown) that treat water as it exits the water storage bladder 226.

The one or more of filters may include at least one of a first sediment filter, a second sediment filter, a carbon filter, a first pathogen filter, and a second pathogen filter. The sediment filters may filter sediment and mineral content from water collected by the system 100. The carbon filter may filter mineral, particulate, and other content from the water. The first and second pathogens filters filter various pathogens such as bacteria and other microbial organisms from the water. Water passes through the filter or filters. The filters may be sequentially connected to one another. For example, water may flow through the first and second sediment filters, then through the carbon filter, and finally through the first pathogen filter and the second pathogen filter. A final sediment, carbon, and/or pathogen filtration stage may be added to ensure water quality.

Any one or more of the plurality of filters may be tubular or flat. Additionally, any one or more of the plurality of filters may be a membrane filter. The membrane filters may have a pore size of 0.1 microns to 10 microns. Such filters prevent bacteria, fungal spores, and other pathogenic microorganisms from passing through, thereby neutralizing such pathogens in the filter water. Bacteria typically range in size from 0.5 microns to 5 microns in length, fungal spores from 2 microns to 200 microns, and amoebas from 200 microns to 500 microns.

The ozone generator may employ any one or more of the common in situ ozone generation techniques, such as corona discharge or UV photochemical generation.

In operation, an air compressor or fan (not shown) may operate within the first subsystem 102 to draw air, through vents (not shown) in the intake vent 207 and into the air intake filter 206. As air passes through the filter, a carbon or titanium dioxide coating on the interior portion of the air intake filter 206 neutralizes airborne and surface pathogens. In some embodiments, many bacteria and other microorganisms are destroyed by contact with titanium dioxide, and pathogens such as these are neutralized as they make contact with, and pass through, the air intake filter 206. Thus, the system 100 may, during an initial purification or sterilization stage, neutralize pathogens while water vapor in the air is in a gas phase (i.e., prior to water condensation).

However, in other embodiments, contact with titanium dioxide may increase pathogen content. In these embodiments, the various other elements of the pathogen neutralizing module neutralize the pathogens that are not destroyed by contact with titanium dioxide. In still other embodiments, pathogens are neutralized on contact with titanium dioxide in the presence of ultraviolet radiation.

The plurality of LEDs 208 may irradiate humid air having water vapor as it passes through the air intake filter 206 to further neutralize pathogens circulating through the filter. The LEDs 208 may operate in the ultraviolet spectrum, such as, in an illustrative embodiment, at 254 nanometers. In various embodiments, the LEDs 208 may emit other spectra of UV radiation, e.g. 405 nanometers.

As humid air exits the intake filter 206, it may come into contact with the cooling element 204. The cooling element 204 may be coated, like the air intake filter 206, with titanium dioxide or carbon and/or illuminated by one or more ultraviolet LEDs to further reduce or neutralize pathogens in the intake air. The cooling element 204 may operate at a temperature that is below the dew point such that water vapor in the intake air condenses on the cooling element 204 and drips as it accumulates on the cooling element 204 into the water collector 210. Thus, the system 100 may further neutralize pathogens during a secondary treatment, in which purification or sterilization stage—i.e., when the water vapor has condensed on the cooling element 204 into a liquid water phase.

Referring to FIG. 6, the system includes a controller having a processor and a memory having tangible, non-transitory, computer-readable instructions stored thereon that, when executed by the processor, cause the processor to adjust the operating temperature of the cooling element 204 to a temperature that is below the measured dew point. The dew point may be measured by one or more sensors configured to measure the dew point in the system 100. The dew point may also be calculated by accessing online weather databases that include local weather conditions. In various embodiments, the processor may adjust the temperature of the cooling element 204 to a temperature that is between 1 to 25 degrees Fahrenheit below the measured dew point, so that the system 100 does not expend electrical energy beyond what is needed to reduce the cooling element 204 temperature to a temperature that is below the dew point.

The system 100 may therefore improve its operating efficiency by varying the cooling element 204 temperature to correspond to variations in the dew point temperature. The system 100 may adjust the cooling element 204 temperature based upon the dew point temperature automatically or based upon a manual input by an operator, which may be provided to the system 100 by way of an application interface provided on a wireless communications device that is communicatively coupled to the system 100.

Moreover, the illustrative controller 120 may receive further system status information such as a temperature of the cooling element 204, an indoor temperature, an outdoor temperature, an indoor humidity, an outdoor humidity, and the like from various sensors. The controller may use this additional information to further improve its operating efficiency when varying the cooling element 204 temperature.

In some embodiments, the system 100 may improve its operating efficiency by causing the controller 120 to engage the cooling element 204 when the indoor and outdoor temperatures vary beyond a certain amount, such as 5° F., 10° F., 15° F., 20° F., or 25° F. In other embodiments, the system 100 may improve its operating efficiency by causing the controller 120 to engage when the indoor humidity and outdoor humidity vary beyond a certain percent, such as 5%, 10%, 15%, 20%, or 25%. In still other embodiments, the system 100 may improve its operating efficiency by causing the controller 120 to engage when certain combinations of outdoor temperature and humidity are favorable to water vapor condensation are measured. For example, outdoor temperatures above 75° F., 80° F., 85° F., 90° F., 95° F., or 100° F. degrees Fahrenheit and outdoor humidity of 30%, 35%, 40%, 50%, 60%, 70% or higher for condensing water vapor.

The cooling system 100 may further power on and power off based upon a water level and/or pressure in the water storage tank 212 or water storage bladder 226. For example, the system 100 may power "on" to generate water in response to a determination that the water level in either of the water storage tank 212 or water storage bladder 226 is below 100% of the total water storage capacity. Also, the system 100 may power off in response to a determination that the water level in either of the water storage tank 212 or water storage bladder 226 is less than 100% of the total water storage capacity. In another embodiment, the system 100 may power off in response to a determination that the water level in either of the water storage tank 212 or water storage bladder 226 is 100% of the total water storage capacity of either. In another embodiment, the system 100 may power off in response to the water pressure in either of the water storage tank 212 or water storage bladder 226 is 12 psi, 13 psi, 14 psi, or 15 psi.

The water collector 210, like the air intake filter 206 and cooling element 204, may be coated with carbon or titanium dioxide and/or illuminated by ultraviolet light are associated with the first outdoor subsystem. The water collector 210 may funnel water into the water storage tank 212, and a pump coupled to the water storage tank 212 may pressurize water in the tank 212 to a specified pressure. In a preferred embodiment, water in the water storage tank 212 is pressurized to a pressure in the range of 12-14 psi. In various embodiments, a pressure exceeding 12-14 psi may encourage the formation of pathogens, such as bacteria, in the plurality of filters as water is transferred from the first subsystem 102 to the second subsystem 104.

In one illustrative embodiment, a pressure exceeding 12 psi may cause one or more porous elements within at least one of the filters 216 may permit pathogens to enter the closed loop system second indoor subsystem. Thus, the system may limit the water pressure prior to and during filtration to pressures of approximately 12 psi, while after filtration (e.g., as water is pumped into and stored in the water storage bladder 226), water pressures may also remain approximately 12 psi or water pressures may exceed 12 psi depending on engineering requirements.

More specifically, water is transferred from the first subsystem 102 to the second subsystem 104 by way of the illustrative water tubing 106. In various embodiments, the tubing 106 may comprise any suitable length, such as any length that is less than or equal to fifty feet. The tubing 106 may further, in certain embodiments, comprise any suitable thickness, such as one quarter of an inch, and the tubing 106 may, like the rest of the system, comprise an antimicrobial material or a material coated with an antimicrobial agent.

As water enters the second subsystem 104, it may be stored in the water storage bladder 226. As water accumulates in the bladder 226, the bladder may, by its increasing mass, force the compressor 222, upon which it rests, to compress. Water may be maintained within the second subsystem 104 (e.g., within the bladder 226) in a vacuum (or near vacuum), such that the water does not come into contact, after filtration and/or sterilization at the first subsystem 102 with secondary or unintentionally introduced airborne pathogens. In other embodiments, water may be maintained within the water bladder 226 in a vacuum. In further embodiments, water may be maintained within the second subsystem in a positive pressure. In still further embodiments, water may be maintained within the water bladder 226 in a near vacuum. The second subsystem 104 is therefore, in this regard, a closed or isolated system. The water storage bladder 226 is, in addition, may be maintained in vacuum or under positive pressure such that the bladder 226 is devoid of air.

The illustrative second indoor subsystem 104 may respond to a request or an input, such as a mechanical input provided by an operator of the system 100 at the tap 108, to dispense water by releasing energy stored in the compressed compressor 222, such that the compressor 222 decompresses or expands, causing water to flow from the bladder 226 to the tap 108. Thus, the water stored within the water bladder 226 is forced out of the water bladder 226 and through the tap 108 in response to expansion of the compressor 222. In various embodiments, the compressor includes a mechanical spring, and the decompression occurs along the helical axis of the spring to squeeze the bladder 226. The compressor 222 may be allowed to decompress, when a valve (not shown) on the tap is opened. In various embodiments, as water exits the bladder 226 on its way to the tap 108 the water passes through a series of sediment, carbon, and pathogen filters. These filters remove or neutralize sediment, minerals, various odors and discolorations, and any remaining pathogens from the water at this stage.

As described above, the first subsystem 102 may be located outdoors and may be coupled, by way of one or more water carrying tubes 106, to the second subsystem 104, which may be located indoors for convenience and such that water can be dispensed indoors. Placement of the first subsystem 102 outdoors confers several advantages. For example, as described above, the first subsystem 102 may include an air compressor, which may during operation produce undesirable motor or air compressor noise if placed indoors. The first subsystem 102 may be separated or decoupled, by way of the water tubing 106, from the second subsystem 104, permitting placement of the quieter second subsystem 104 indoors. Generally, the humidity of outdoor air has more water vapor and is, typically, capable of producing a greater water yield than indoor air, which is often pre-filtered and dehumidified by heating and cooling systems.

With reference now to FIGS. 9-15, there is shown an illustrative wireless communications device display 300 displaying a user interface 302 that includes various functions, for monitoring and controlling the system 100 for atmospheric water generation as described herein and in accordance with various embodiments. By way of example and not of limitation, the wireless communications device may be embodied as a tablet, smartphone, or other wireless capable device. The wireless communication device may also be interchangeably referred to as mobile communication device. The user interface 302 may be generated by a downloaded software application executed on the wireless communications device.

To this end, the mobile communications device may comprise a controller or processor 280, a tangible, non-transitory, computer-readable medium or memory 290, and a display. The processor 280 is configured to execute instructions for the software application, which may be stored on the tangible, non-transitory, computer-readable memory 290 of the wireless communications device 300. The mobile communications device may further include a variety of communications hardware for communicating with the system 100, such as a network interface card and one or more radios. The radio may be include one or more of a WiFi radio system, a BLUETOOTH radio system, a cellular radio system, and the like.

The tangible, non-transitory, computer-readable memory 290 may have a variety of information stored thereon including a database of status information and at least one operating instruction for the system 100. The status information may include data received from one or more sensors, such as indoor temperature, outdoor temperature, indoor humidity, outdoor humidity, outdoor dew point temperature, water storage tank 212 water level, water bladder 226 water level, water storage tank 212 pressure, and water bladder 226 pressure. The processor 280 or controller receives input from the various sensors to update the database of status information. The operating instructions for the system 100 may include various routines for powering on and off the fan, the cooling element 204, the first and second plurality of LEDs 208, and the various transfer pumps.

Figure 9:
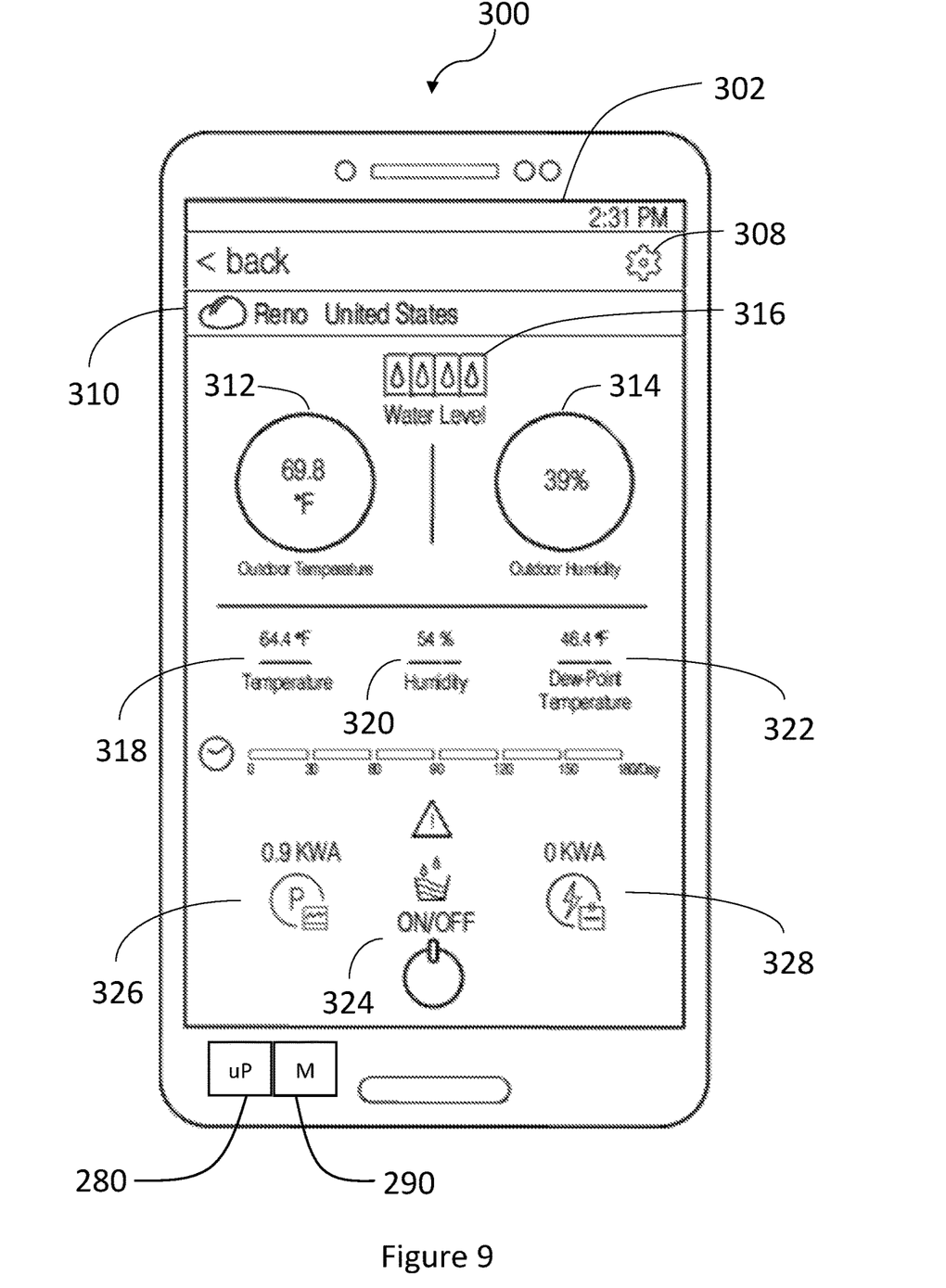
FIG. 9 shows an illustrative wireless communications device display displaying a homepage of an application interface for controlling the system for atmospheric water generation as described herein and in accordance with various embodiments.

Thus, the software application may enable remote control and monitoring of the system 100. For example, an operator of the mobile communications device may interact with the user interface 302 to receive status information associated with the system 100 as well as to provide control instructions to the system 100. Thus, the system 100 may be remotely controlled and monitored through the user interface 302. For example, the processor of the wireless device may control the temperature of the cooling element 204, such as to set the cooling element temperature below a dew point temperature.

In various embodiments, the system 100 operator may receive alerts or messages indicating, as appropriate, that one or more filters, LEDs, and other system 100 components require replacement, cleaning, or attention. Thus, a system operator may remotely monitor a plurality of water generation systems and may, in response to detection of an alert or message, as described, dispatch a technician to perform maintenance on one or more water generation systems prior to, or in response to, system failure and in the absence of, or prior to, the placement of a service call or service inquiry to the operator by a customer or user.

Accordingly, with particular reference now to FIG. 9, there is shown a homepage displayed on user interface 302. The homepage may include a variety of control or status icons. For example, the homepage may include a weather icon (not shown), a settings icon 308, a system location and weather icon 310, an outdoor temperature icon 312, an outdoor humidity icon 314, a system 100 or machine name icon (not shown), a water level icon 316, an indoor temperature icon 318, an indoor humidity icon 320, a dew point temperature icon 322, a power on/off icon 324, a daily power consumption icon 328, a weekly power consumption icon 326, a monthly power consumption icon (not shown), and/or an annual power consumption icon (now shown). Thus, the wireless communications device may display an outside temperature, an outdoor humidity, a water level, an indoor temperature, an indoor humidity, and a dew point. In other embodiments, the wireless communications device may further display a daily power usage, a weekly power usage, a monthly power usage, and an annual power usage.

Figure 10:
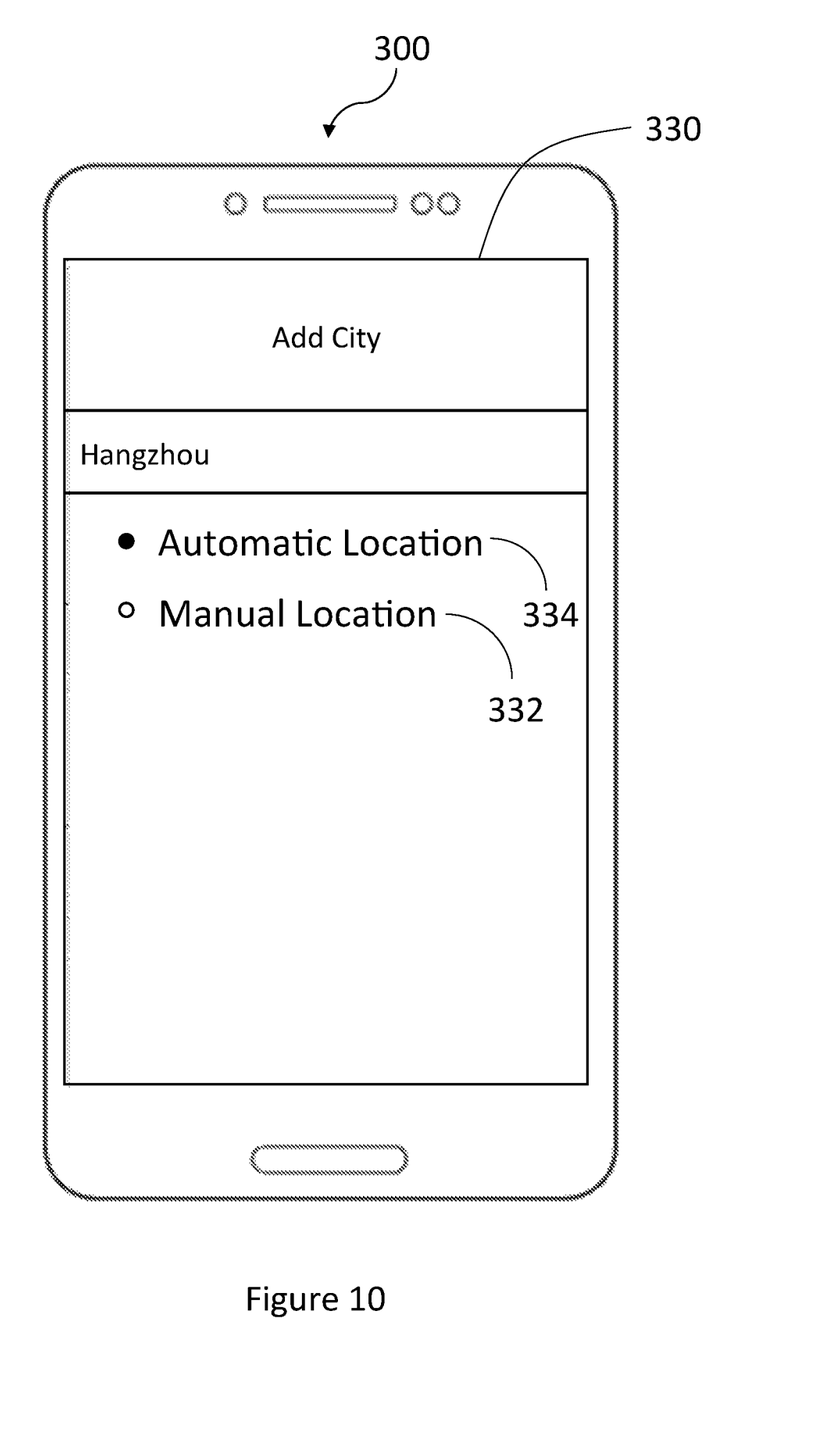
FIG. 10 shows an illustrative wireless communications device display displaying a city or location selection page of an application interface for controlling the system for atmospheric water generation as described herein and in accordance with various embodiments.

In various embodiments, the weather icon (not shown) may be selected to display a temperature and/or weather for the location of the system 100. In various embodiments, the weather icon (not shown) may be selected to retrieve a temperature and/or weather for the location of the system 100. The software application may connect to an online weather service database or website to retrieve weather for the location of the system 100 in response to operator input. The user interface 302 may display the system 100 location and weather icon 310 in response to selection of the weather icon (not shown). As shown at FIG. 10, the weather icon (not shown) may also cause the user interface 302 to display a city or location selection page 330. The city or location selection page 330 may permit the operator to select a Manual Location option 332 to manually enter a city or location.

The operator may also, from the city selection page 330, select an Automatic Location option 334 that enables the software application to automatically determine a location of the system 100. The software application may automatically determine a location of the system 100 by interrogating the system 100. For example, the software application may communicate with the system 100 to request that the system 100 transmit its location to the software application. The location may be based upon a location record stored in the memory of the system 100, a GPS signal received by a GPS receiver installed in the system 100, an IP address associated with the system 100 or other such location determination methods.

Figure 11:
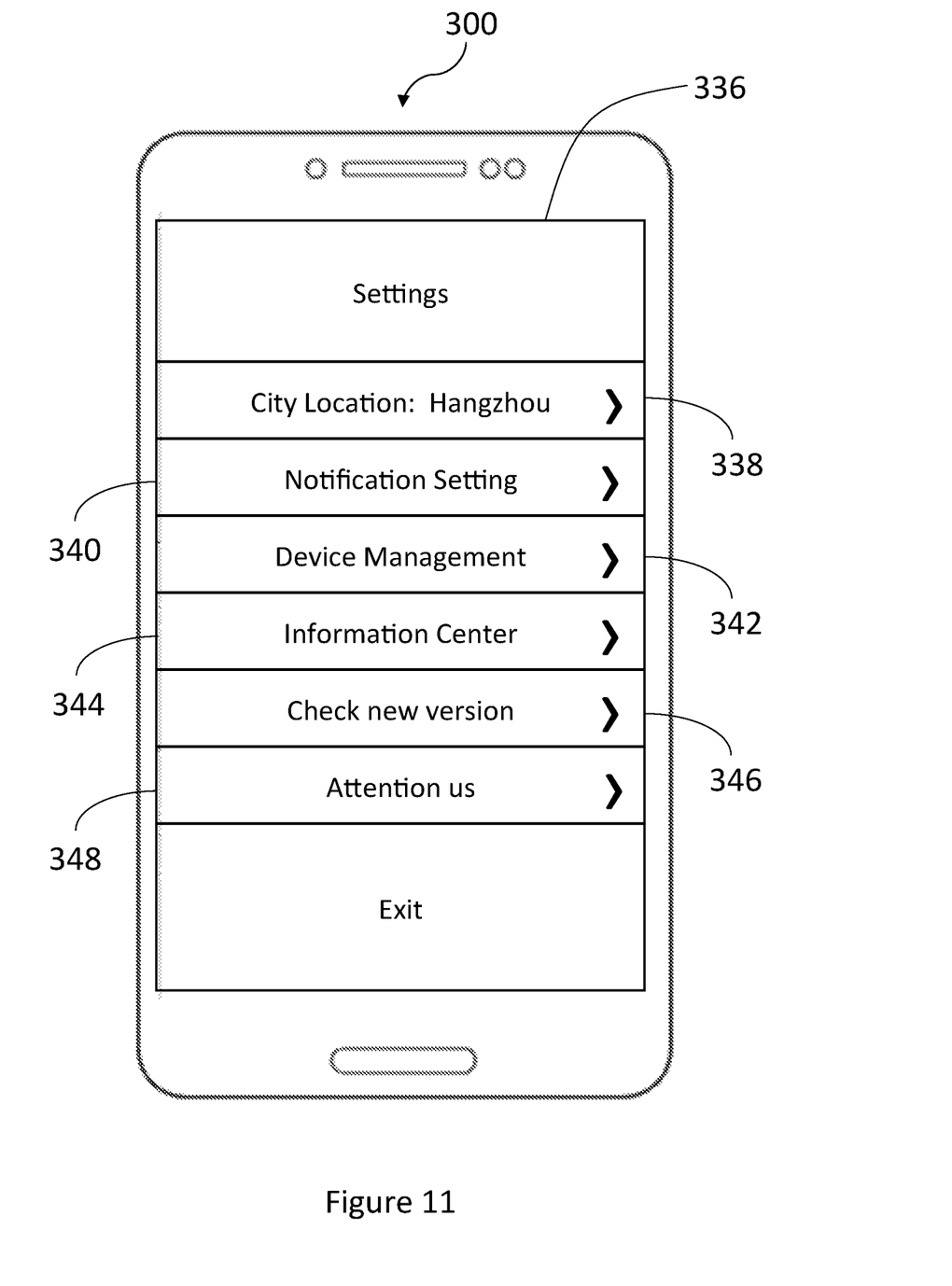
FIG. 11 shows an illustrative wireless communications device display displaying an illustrative settings page of an application interface for controlling the system for atmospheric water generation as described herein and in accordance with various embodiments.

The settings icon 308 shown in FIG. 9 may enable a settings function of the software application. For example, as shown at FIG. 11, an operator may select the settings icon, which may cause the user interface 302 to display a settings page 336. From the settings page 336, the operator may select a city or location 338, one or more notification options 340, a device management option 342, an information center option 344, an option to check for software updates 346, or an option to contact the manufacturer 348 of the system 100.

Figure 12:
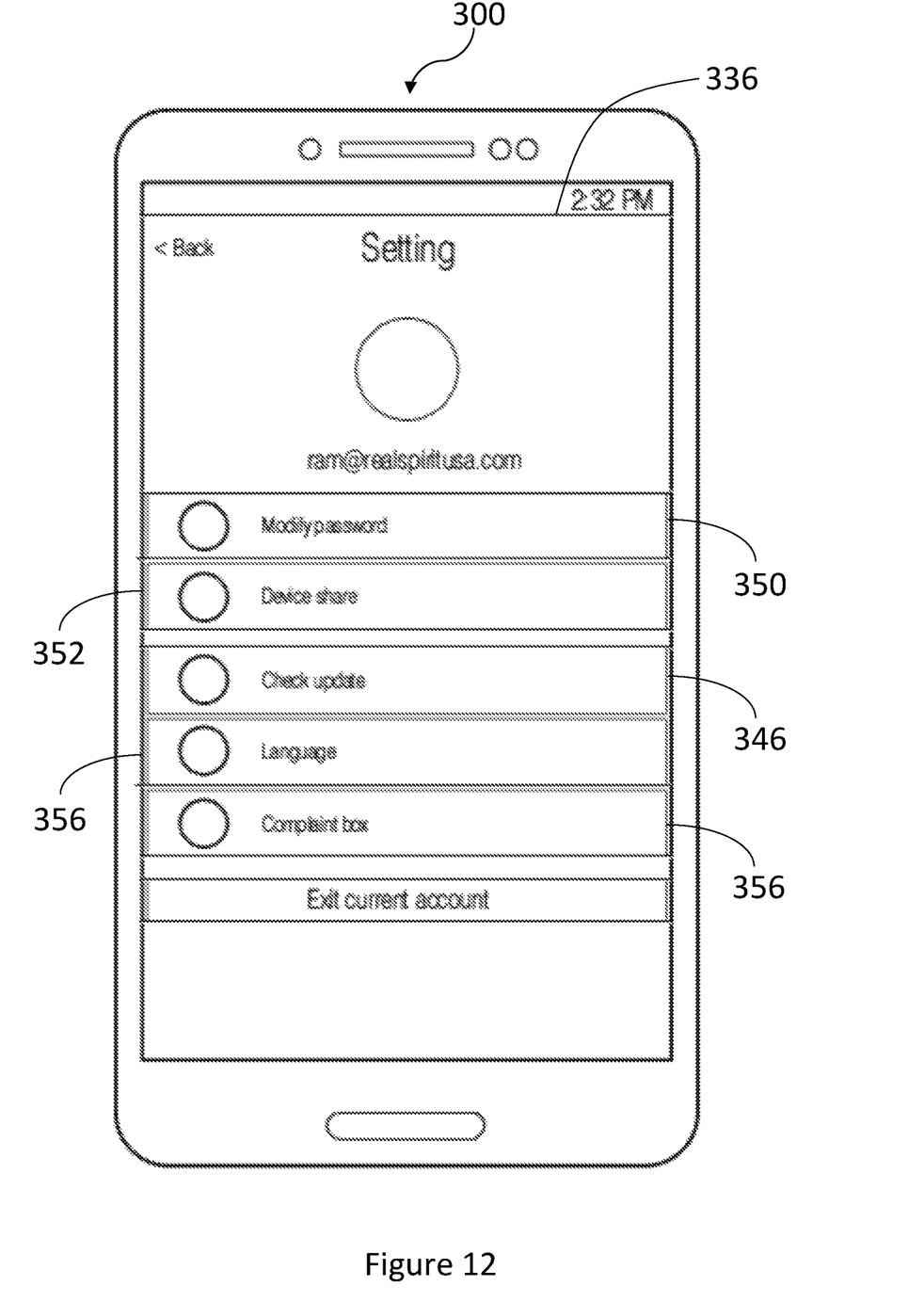
FIG. 12 shows an illustrative wireless communications device display displaying a second illustrative settings page of an application interface for controlling the system for atmospheric water generation as described herein and in accordance with various embodiments.

In a second embodiment as shown at FIG. 12, the settings page 336 may allow the operator to select an option to modify the user password 350, a share option 352, an option to check for software updates 346, a system language option 354, and an option to contact the manufacturer 356 of the system 100.

Figure 13:
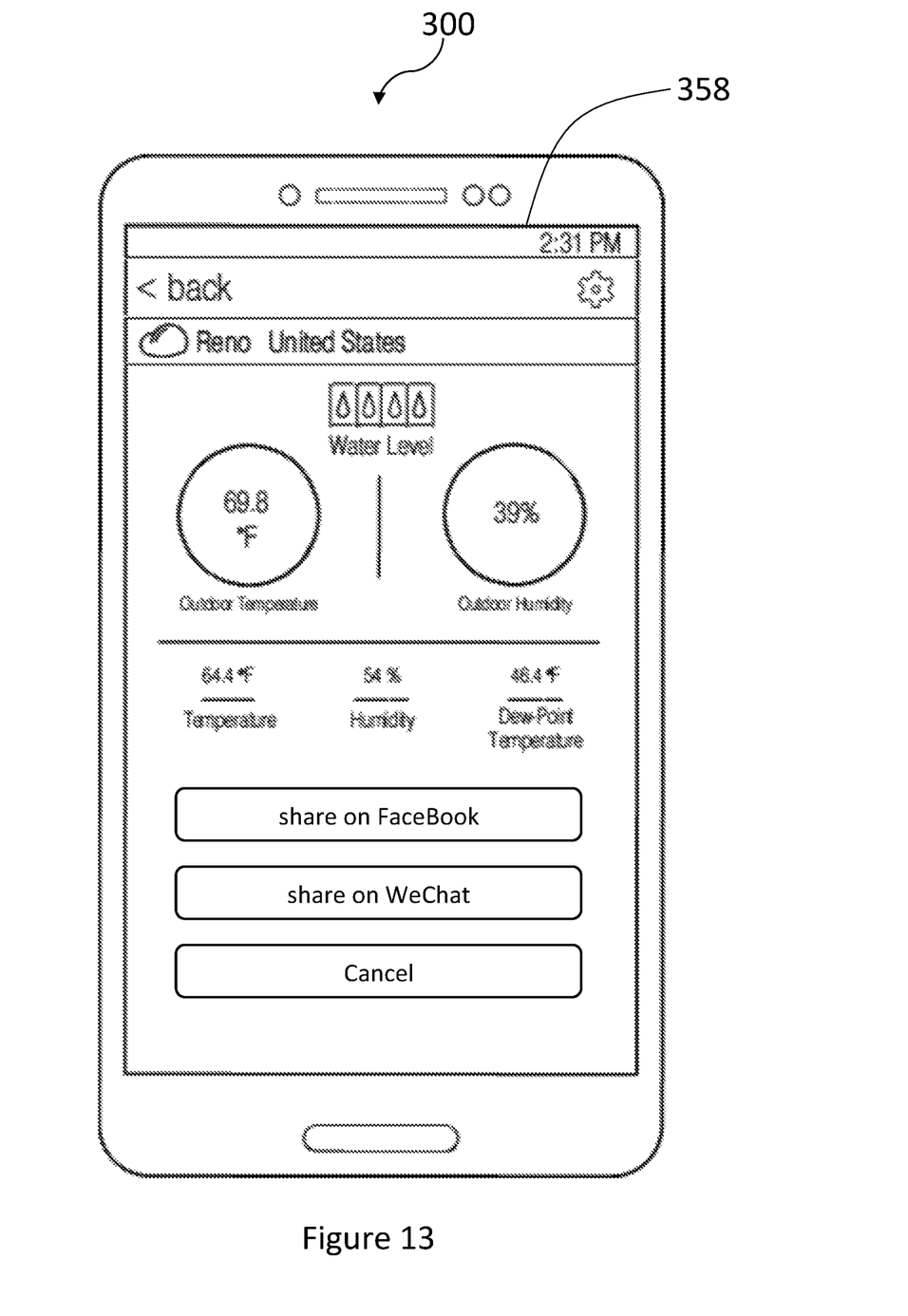
FIG. 13 shows an illustrative wireless communications device display displaying a sharing page of an application interface for controlling the system for atmospheric water generation as described herein and in accordance with various embodiments.
Figure 14:
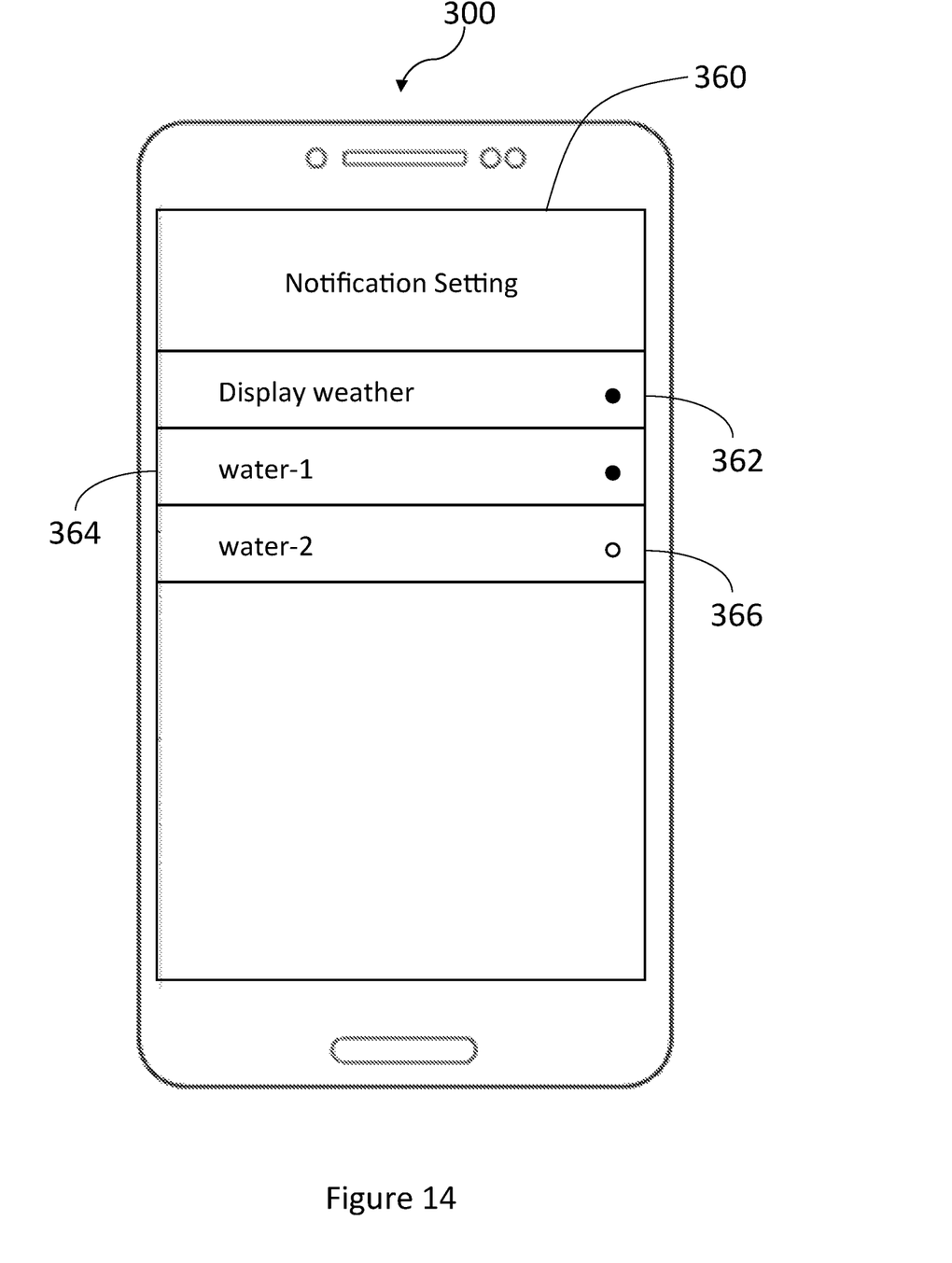
FIG. 14 shows an illustrative wireless communications device display displaying a notification setting page of an application interface for controlling the system for atmospheric water generation as described herein and in accordance with various embodiments.
Figure 15:
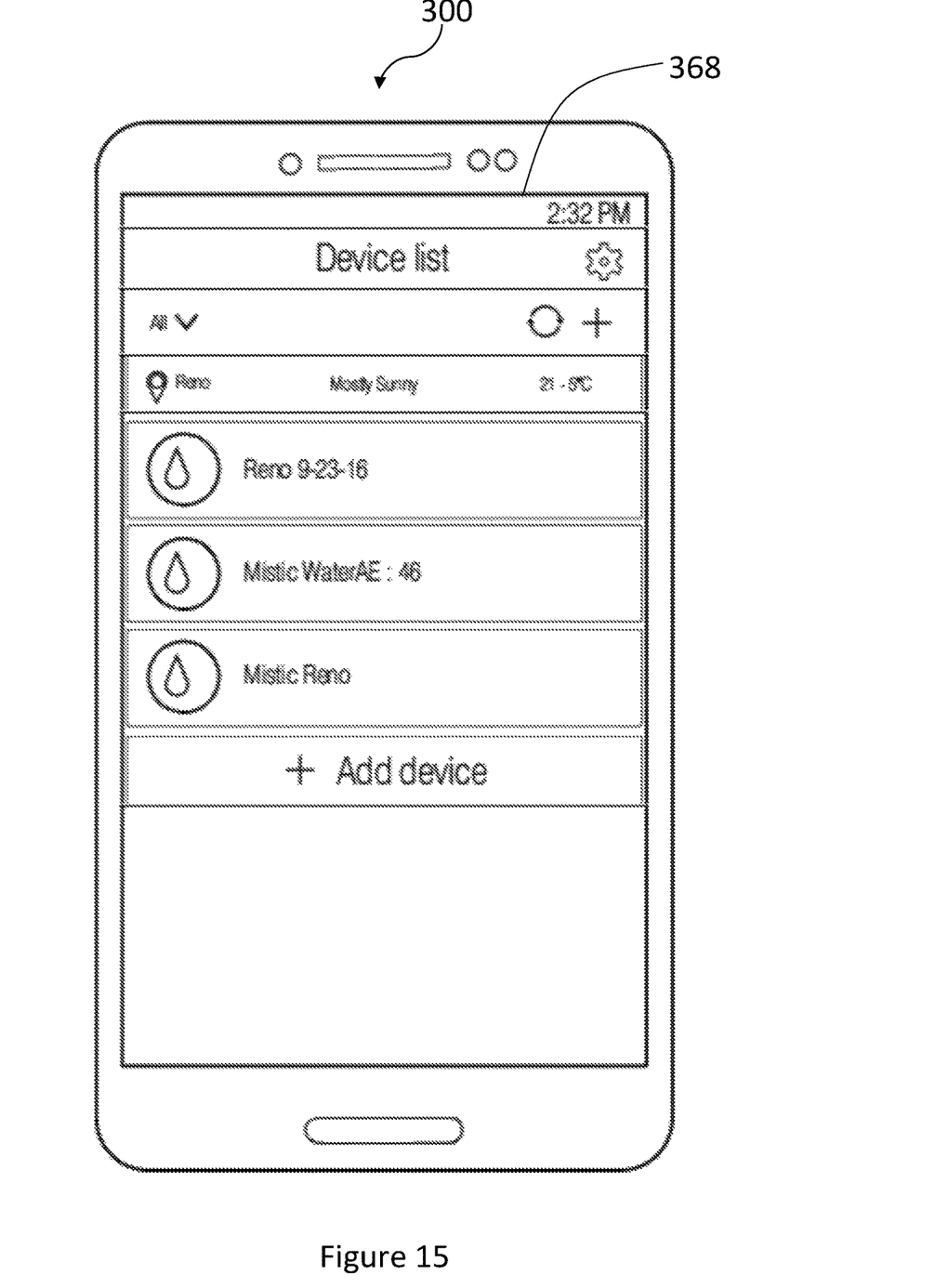
FIG. 15 shows an illustrative wireless communications device display displaying a device list page of an application interface for controlling the system for atmospheric water generation as described herein and in accordance with various embodiments.

The share option 352 may enable the sharing function of the software application. For example, as shown at FIG. 13, an operator may select the share option icon 352, which may cause the application interface 300 to display a sharing page 358. The sharing page 358 may permit the operator to share data associated with the system 100 via any suitable media sharing or social networking website or application.

Where the operator selects a notification option, the user interface 302 may present a notification settings page 360, as shown with respect to FIG. 14. In various embodiments, the notification settings page 360 may permit the operator to select an option to display outdoor or indoor temperature or weather 362. In other embodiments, where there is a plurality of systems 100 coupled to the software application, the notification settings page 360 may permit the operator to select an option to display a system with respect to which various notifications or other information should be displayed. Again, with reference to FIG. 14, selection options for a system titled "water-1" 364 and a second system titled "water-2" 366 are available as illustrative operator selections.

Where the operator selects a device settings option, the user interface 302 may present a device list page 368, as shown with respect to FIG. 15. In various embodiments, the device settings page 368 may permit the operator to name, add, or remove one or more systems 100 coupled to the software application.

Referring to FIG. 9, the outdoor temperature icon 312 may display the outdoor weather for the system 100. For example, the outdoor temperature icon 312 may display the ambient temperature for the air surrounding the first subsystem 102. A temperature sensor (not shown) in the first subsystem system 102 may measure the outdoor temperature.

The outdoor humidity icon 314 may display the outdoor humidity for the system 100. For example, the outdoor humidity icon 314 may display the humidity in the air surrounding the system 100. A humidity sensor (not shown) in the system 100 may measure the humidity or the humidity may be determined from a weather station near the location of the system 100.

The water level icon 316 may display the water level in the system 100. A water level sensor in the system 100 may measure the water level or total amount of water collected by the system 100 during a specified or preset period of time. More particularly, either or both of the water storage tank 212 (shown in FIG. 6) or water storage bladder 226 (shown in FIG. 8) may include a water level sensor, and the user interface 302 may be configured to display the current water level or total amount of water collected in either or both of the water storage tank 212 and the water storage bladder 226 during a specified or preset period of time.

The indoor temperature icon 318 may display the indoor temperature for the system 100. For example, the indoor temperature icon 318 may display the ambient temperature for the air surrounding the second subsystem 104 at an indoor location. A temperature sensor in the system 100 may measure the indoor temperature.

The indoor humidity icon 320 may display the humidity for the air surrounding the second subsystem 104 at an indoor location. For example, the indoor humidity icon 320 may display the humidity in the air surrounding the system 100. A humidity sensor in the system 100 may measure the indoor humidity.

The dew point temperature icon 322 may display the dew point temperature for the air surrounding the first subsystem 104 at an outdoor location. For example, the dew point temperature icon 322 may display the current dew point temperature of the air surrounding the second subsystem 104. A dew point temperature sensor in the system 100 may measure the dew point temperature.

Where the user interface 302 presents a power consumption icon, the operator may calculate, based upon a cost of power and the displayed water level, a cost associated with water production. The cost associated with water production may be based upon a volume of water generated during a time period and an amount of power consumed during the time period. In various embodiments, the processor may calculate a cost associated with water production. The power consumption icon may be a daily 328, weekly 326, monthly, or annual power consumption icon. The displayed water level may be current or cumulative over a period of time corresponding to the power consumption icon. The cost associated with water production may be a cost per gallon or a cost per liter. The software application may further perform and display this calculation automatically or in response to an operator input requesting a cost associated with water production.

It is to be understood that the detailed description of illustrative embodiments is provided for illustrative purposes. Thus, the degree of software modularity for the system and method presented above may evolve to benefit from the improved performance and lower cost of the future hardware components that meet the system and method requirements presented. Additionally, with respect to the indoor and outdoor systems described above, the systems may evolve and be improved upon based on improvements to pathogen neutralizing technologies and cooling systems for the collection of water vapor. The scope of the claims is not limited to these specific embodiments or examples.

Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for atmospheric water generation, the system comprising:
   a first subsystem configured to be located in an outdoor location, the first subsystem including,
      a first housing,
      a cooling element configured to receive outdoor air at ambient pressure,
      a water collector disposed near the cooling element that is configured to collect a condensed water; and
   a second subsystem configured to be located in an indoor location, the second subsystem coupled to the first subsystem, the second subsystem including,
      a second housing,
      a pathogen neutralizing module including a membrane filter having a pore size of 0.1 microns to 10 microns, wherein the pathogen neutralizing module configured to receive the condensed water at 12 to 14 pounds per square inch (psi) of pressure above ambient pressure and remove pathogens from the condensed water;
      a water storage bladder coupled to the pathogen neutralizing module, the water storage bladder being void of air, configured to receive the condensed water, and configured to be pressurized to 12 to 14 psi above ambient pressure by a stored energy device, and
      a tap coupled to the water storage bladder.

2. The system of claim 1 further comprising a plurality of ultraviolet light emitting diodes (LEDs) disposed over an air intake filter.

3. The system of claim 2 wherein the plurality of LEDs emit ultraviolet light having a wavelength of 254 nanometers.

4. The system of claim 1 wherein the first subsystem is separated from the second subsystem by an external tube that couples the first subsystem to the second subsystem.

5. The system of claim 1 wherein the first subsystem further comprises an air intake filter that is coated with at least one of a carbon material and a titanium dioxide material.

6. The system of claim 1 wherein the cooling element is coated with at least one of a carbon material and a titanium dioxide material.

7. The system of claim 1 wherein the pathogen neutralizing module further comprises at least one of a first sediment filter, a second sediment filter, a carbon filter, a first pathogen filter, and a second pathogen filter.

8. The system of claim 1 wherein the pathogen neutralizing module further comprises an ozone generator.

9. The system of claim 1 wherein the second subsystem further comprises a platform disposed under the water bladder and a compressor disposed under and in contact with the platform, wherein the compressor is compressed by the weight of the water stored within the bladder.

10. The system of claim 9 wherein the compressor forces the water stored within the water bladder out of the water bladder and into the tap in response to expansion of the compressor.

* * * * *